United States Patent Office

2,875,170
Patented Feb. 24, 1959

2,875,170

VULCANIZABLE OIL EXTENDED RUBBER COMPOSITION AND METHOD OF PREPARING

George W. Ayers, Chicago, and Marcellus J. Geerts, Evanston, Ill., assignors to The Pure Oil Company, Chicago, Ill., a corporation of Ohio No Drawing. Application July 29, 1953
Serial No. 371,144

12 Claims. (Cl. 260—33.6)

The present invention relates to an improved rubber composition. More particularly, the present invention relates to an oil extended synthetic rubber composition having improved splicing properties. In a still more specific aspect, the present invention relates to an oil extended synthetic rubber characterized by increased ease of splicing and increased adhesion to fabrics.

Prior to the introduction of various synthetic rubbers during World War II, small amounts of oils, such as vegetable and mineral oils, had been used as modifying agents in rubber goods. These uses were generally limited to the reclamation of used rubber, which in many cases became a major component of the rubber composition, and as softeners or plasticizers in the processing of rubber.

The short supply of rubber and the introduction of synthetic rubbers during World War II brought a number of new problems to the rubber industry and necessitated much work before the synthetic rubbers could be used successfully. Many of these problems involved modifiers and extenders for the new rubbers and for formulations involving admixtures of the new rubbers with natural rubber.

The most important synthetic rubber developed was GR–S, which was formed by the polymerization of approximately 72 parts of butadiene with 28 parts of styrene with a peroxide or persulfate catalyst and a mercaptan as a modifying agent to control the degree of polymerization. The polymerization was carried out by (1) the hot process or (2) the cold process, the former process accounting for the largest part of synthetic rubber production. However, "cold" rubber was found to be of higher quality than regular GR–S (hot rubber). A further and more recent discovery was that polymers produced by more complete polymerization of the same mixture of butadiene and styrene were superior in quality to either the "hot" or "cold" rubbers formerly produced. These high-molecular weight products are polymerized to a degree such that their Mooney viscosities are substantially above 65 when measured at 212° F. for 4 minutes. An example of such products is "Polygen" GR–S produced by General Tire and Rubber Company.

Since synthetic rubber has a higher Mooney viscosity than natural rubber and the milling of rubber is dependent upon the Mooney viscosity of the rubber, means of decreasing the high Mooney viscosity were necessarily devised. Heat-softening is one method which has been used for reducing the Mooney viscosity of artificial rubber (particularly "hot" rubber). However, this method has not been too successful from a commercial standpoint. From the standpoint of processing ease, it was determined that the addition of oils, such as those previously employed as softeners or plasticizers, reduced the Mooney viscosity to the extent desired and had no detrimental effect on the physical properties of the product. It was also found that these processing oils could be used in amounts far in excess of the amounts normally used in softening and plasticizing to replace a certain amount of the synthetic polymer and thus "extend" the polymer.

The use of oils of petroleum origin as extenders or processing oils for natural rubber and synthetic elastomers was first proposed in 1936. The first product introduced for this purpose was Naftolen, a petroleum oil recovered from the acid sludge produced in the treatment of petroleum oils with sulfuric acid. This material was used commercially as a rubber extender just before and during World War II. Early work with Naftolen indicated that the carbon black content of the rubber should be increased with the increase in the proportion of Naftolen used in the rubber. In its capacity as an extender, Naftolen was shown to be suitable for use in natural rubber, GR–S, and reclaimed rubber. In view of the developments outlined above and the successful use of Naftolen, a number of petroleum oil extenders soon appeared on the market. Naphthenic oils, such as Circosol 2XH, as well as highly aromatic oils, such as extracts from the solvent extraction of lubricating oils, were used commercially.

GR–S rubber, particularly the low-temperature polymerized type, has been successfully extended with petroleum oils in amounts up to 100 parts of petroleum oil per 100 parts of rubber hydrocarbon. Such extended GR–S rubber is satisfactory from the standpoint of most physical tests, but it is markedly deficient with respect to splicing and with respect to adhesion of the rubber to fabrics. On the other hand, GR–S rubber extended with certain organic plasticizers, such as "reduced" Gray tower polymers, rosin oil, polyisobutenes, and polypropenes, has been found to possess adhesive properties. Although such rubber may have excellent tensile strength, abrasion resistance, resistance to cut growth, and resistance to heat build-up, it is deficient in certain other physical properties, such as extremely poor low temperature retraction characteristics, which are important in commercial rubber applications. In addition, when certain of these oils are employed, excessive tackiness results.

It is, therefore, an object of this invention to provide an improved rubber composition.

Another and further object of this invention is to provide an improved oil extended rubber composition.

Still another object of this invention is to provide an oil extended rubber composition having improved adhesive properties.

A further object of this invention is to provide an oil extended synthetic rubber characterized by increased ease of splicing and increased adhesion to fabrics.

A still further object of this invention is to provide an improved oil extender for rubber.

Another object of this invention is to provide an improved oil extender for synthetic rubber.

Another and further object of this invention is to provide an oil extender for GR–S rubber which imparts improved splicing properties and improved properties of adhesion of fabrics to the rubber.

A still further object of this invention is to provide a rubber tire tread stock having improved building properties.

These and other objects and advantages of the present invention will be apparent from the following detailed description.

In accordance with the present invention, it has been found that mixtures of mineral oil rubber extenders with certain organic plasticizers are superior to either oil alone when employed as extenders for rubber. In accordance with a more specific aspect of this invention, it has been found that mixtures of mineral oil-type rubber extenders, such as lubricating oil extracts, and certain organic plasticizers, such as "reduced" Gray tower polymers, rosin oil, polyisobutenes, polypropenes and mixtures thereof, when compounded with rubber in rubber extending quantities will produce a product which possesses improved splicing and adhesive properties in addition to meeting all other physical requirements.

For the purposes of this invention, rosin oil is defined as the oily product resulting from the distillation of rosin; rosin products, such as disproportionated rosin; and any products derived from rosin by destructive decomposition, such as products of the decarboxylation or dehydrogenation of rosin.

By "reduced" Gray tower polymers is meant the highly unsaturated oily product obtained as a residue from the steam distillation of the crude polymers produced by the action of clay on unsaturated gasoline at temperatures in the vicinity of 350° F.

The polyisobutenes and polypropenes, referred to herein, include products of this character containing little or no material boiling below 400° C. These products should be oily in nature and preferably tacky.

The mineral oil extenders contemplated herein include a variety of petroleum oils. The U. S. Government has published specifications covering these oils which will serve as a guide to the type of oils contemplated. Typical examples of these extenders are unrefined petroleum distillates boiling in the lubricating oil range and aromatic solvent extracts which are solvent soluble by-products obtained in the manufacture of lubricating oils. Table I below lists the characteristics of several materials of the latter type:

Table I

|  | Extract #1 | Extract #2 | Extract #3 | Extract #4 |
|---|---|---|---|---|
| Gravity (°API) | 16.6 | 11.2 | 11.7 | 13.4 |
| Flash (C. O. C.) (° F.) | 555 | 390 | 450 | 445 |
| Fire (C. O. C.) (° F.) | 645 | 460 | 490 | 490 |
| Vis./100° F. (SUS) | 10,500 Ext. | 1,187 | 3,916 | 2,400 Ext. |
| Vis./130° F. (SUS) | | | | 723 |
| Vis./210° F. (SUS) | 245 | 63.4 | 111.0 | 95.9 |
| Vis. Index | 46 | −64 | −34 | 2 |
| Pour (Max.) (° F.) | 115 | 40 | 45 | 60 |
| Color (NPA) | +3½ DD | 7+ | +4½ D | 5+D |
| Aniline Point (° F.) | 189.6 | 85.6 | 126.3 | 136.8 |
| Acid No. (ASTM 1948 Method) | 1.40 | 3.82 | 3.73 | 3.39 |
| Ash (Oxide) (percent) | 0.02 | 0.03 |  | 0.03 |
| Carbon Residue (Conradson) (percent) | 3.51 | 0.56 | 2.54 | 2.00 |
| Sulfur (percent) (Total) | 1.88 | 2.65 | 2.47 | 2.37 |
| Bromine No. | 8.5 | 12.1 | 1 | 10.3 |
| Refractive Index ($n_D^{20}$) | 1.5320 | 1.5601 | 1.5563 | 1.5510 |
| Cloud Point (° F.) |  | +40 |  |  |
| Water Content (percent) | 0.0 | 0.0 |  |  |
| Solid Paraffin Content (percent) | 3.7 max. | 2.1 max. |  |  |
| Evaporation Test (280° F.): |  |  |  |  |
| Loss in 6 hrs. (percent) | 0.02 | 2.69 |  | 6.5 |
| Loss in 12 hrs. (percent) | 0.10 | 5.49 |  | 3.4 |
| Rostler Analysis: |  |  |  |  |
| Nitrogen Bases (percent) | 2.5 | 1.9 |  | 2.9 |
| 1st Acidifins (percent) | 18.0 | 24.0 |  | 20.8 |
| 2nd Acidifins (percent) | 56.0 | 58.2 |  | 56.6 |
| Saturates (percent) | 23.5 | 15.9 |  | 19.7 |
| Absorption in 95% sulfuric acid | 25.2 | 28.2 |  |  |

Oils which have been found to be highly valuable are extracts obtained in the solvent refining of lubricating oil fractions to produce 170 viscosity neutral oil.

The relative quantities of the two oils to be used in the mixed oil extenders of the present invention are dependent to some extent on the type of organic plasticizer employed. For example, 95 to 20 parts by volume of mineral oil extender may be mixed with 5 to 80 parts by volume of the organic plasticizer. Mixed oil extenders having the approximate compositions in parts by volume shown in Table II below, have been found eminently satisfactory for use in the practice of the present invention. The mixed oils contemplated herein should have a viscosity below about 180 SUS at 210° F.

Table II

|  | Mineral Oil | Rosin Oil | "Reduced" Gray Tower Polymer | Polypropenes | Polyisobutenes |
|---|---|---|---|---|---|
| Mixed Oil I | 80-60 | 20-40 |  |  |  |
| Mixed Oil II | 80-40 |  | 20-60 |  |  |
| Mixed Oil III | 80-20 |  |  | 20-80 |  |
| Mixed Oil IV | 80-20 |  |  |  | 20-80 |
| Mixed Oil V | 60 | 20 |  |  | 20 |
| Mixed Oil VI | 60 | 20 | 20 |  |  |
| Mixed Oil VII | 60 | 20 |  | 20 |  |

Optimum compositions of the mixed oil extenders are preferably determined by laboratory rubber compounding tests, although this is not absolutely necessary for the production of a suitably extended rubber. It should also be noted that more than one organic plasticizer may be used with the petroleum oil extender as exemplified by mixed oils V, VI, and VII of Table II. It is to be understood that other combinations and quantities of unsaturated hydrocarbon oils may be employed and that the specific examples given in Table II are merely illustrative and are not to be construed as limiting.

In the preparation of rubber products containing the mixed oil extenders of the present invention, amounts of mixed oil extender up to 100 parts of extender per 100 parts of rubber hydrocarbon may be employed. However, 25 to 50 parts of extender per 100 parts of rubber hydrocarbon are preferred.

In addition to the extender, the rubber composition normally contains other additives, of which one is necessarily the vulcanizing agent. Suitable agents of this character are sulfur, sulfur chloride, sulfur thiocyanate, thiuram polysulfides, and other organic and inorganic polysulfides, organic and inorganic peroxides, halogen-containing compounds and nitrogen-containing compounds such as the nitrobenzenes.

Vulcanization accelerators and accelerator-activators may also be present. Illustrative examples of accelerators are N-cyclohexyl-2-benzothiazole sulfenamide (Santocure), diphenylguanidine, mercaptobenzothiazole and its derivatives, thiuram disulfides, thiuram monosulfides and dithiocarbamates. The metal oxides, such as zinc oxide and lead oxides are ordinarily added as accelerator-activators. It is also common practice to add a fatty acid such as stearic acid or oleic acid as an accelerator-activator in addition to the metal oxide.

Age deterioration of rubber goods is generally reduced by the addition of antioxidants such as phenyl-beta-naphthylamine and "Agerite" products such as hydroquinone mono benzyl ether, aldol-alpha-naphthylamine, di-beta-naphthyl-para-phenylenediamine, and diphenyl-ethylene diamine ("Stabilite").

Carbon blacks such as "Philblack O," high abrasion furnace (HAF) blacks, etc., are also major components. These materials act as bodying agents or fillers, thereby improving the tensile strength, tear resistance, and other like properties of the rubber product.

A specific example of a balanced formulation suitable for use as a tire tread stock contains the following ingredients:

| Ingredient: | Parts |
|---|---|
| GR-S polymer | 100.0 |
| Mixed oil extender | 50.0 |
| Philblack "O" | 75.0 |
| Zinc oxide | 3.0 |
| Rubber antioxidant | 0.8 |
| Diphenylguanidine | 0.2 |
| Santocure | 1.1 |
| Sulfur | 2.1 |

The mixed oil extender of this invention may be incorporated in the rubber by any one of the following methods: (1) it may be emulsified and added to the rubber latex before precipitation (masterbatching);

(2) it may be added to the rubber in the compounding stage; or (3) part of the oil may be added before precipitation and the remainder during the compounding stage. In some cases, it may be desirable to add one component of the mixed oil extender before precipitation and the remaining component or components during the processing stage. These methods of incorporating rubber processing oils or extenders in rubber products are well understood by those skilled in the art and, therefore, form no part of this invention and need not be outlined in detail. In any event, the mixed oil extenders of this invention are readily compatible with rubber compositions regardless of the stage at which they are added.

Tire tread stocks prepared from high Mooney viscosity GR-S rubber hydrocarbons and containing the mixed oil extenders of the present invention exhibit excellent tire building characteristics. The improved splicing and adhesive properties imparted to the tread stock by the mixed oil extenders of this invention secure good bonding between the tread strip and the adjacent parts of the carcass of the tire.

Although the composition of the present invention is particularly useful in the preparation of tire tread stocks having improved building characteristics and physical characteristics equivalent to those of the best tread stocks of the prior art, other applications will be apparent to those skilled in the art. For example, tire carcass stocks which require high building tack and good knitting qualities may be prepared by following the teachings of the present invention. In addition, other materials such as coated fabrics, fabric reinforced goods, etc., may be prepared in accordance with this invention.

Having described and illustrated our invention, what we claim and seek to protect by Letters Patent is:

1. An improved vulcanizable rubber composition comprising an unvulcanized synthetic rubber hydrocarbon having permanently incorporated therein 25 to 100 parts per 100 parts of the hydrocarbon of a mixture of (1) a mineral oil selected from the group consisting of lubricating oil and aromatic solvent extracts obtained in the solvent defining of mineral lubricating oils, and (2) an oily material selected from the group consisting of polyisobutenes, polypropenes, and mixtures thereof, and a vulcanizing agent.

2. A rubber composition in accordance with claim 1 in which the synthetic rubber hydrocarbon is a butadiene-styrene polymer.

3. A rubber composition in accordance with claim 2 in which said mixture has a viscosity below about 180 SUS at 210° F.

4. An improved vulcanizable rubber composition in accordance with claim 2 wherein said mineral oil is an aromatic solvent extract of a petroleum lubricating oil.

5. An improved vulcanizable rubber composition in accordance with claim 2 wherein said oily material is a polyisobutene oil.

6. An improved vulcanizable rubber composition in accordance with claim 2 wherein said oily material is a polypropene oil.

7. An improved vulcanizable rubber composition comprising a high Mooney viscosity, unvulcanized rubbery butadiene-styrene polymer having permanently incorporated therein 25 to 50 parts per 100 parts of said polymer of a mixture of (1) 20 to 80 parts of an extract obtained in the solvent refining of a mineral lubricating oil fraction, and (2) 80 to 20 parts of an oily material selected from the group consisting of polyisobutenes, polypropenes, and mixtures thereof, said mixture having a viscosity not exceeding about 180 SUS at 210° F., and a vulcanizing agent.

8. An improved vulcanizable rubber composition in accordance with claim 7 wherein said mixture consists of 80 to 20 parts of an extract obtained in the aromatic solvent refining of a mineral lubricating oil fraction and 20 to 80 parts of a polyisobutene oil.

9. An improved vulcanizable rubber composition in accordance with claim 7 wherein said extract is obtained in the aromatic solvent refining of a mineral lubricating oil fraction to produce a 170 viscosity neutral oil.

10. A tire tread stock having improved building characteristics comprising the reaction product of a rubbery butadiene-styrene polymer having a Mooney viscosity substantially above 65 at 212° F. for 4 minutes, 25 to 50 parts per 100 parts of said polymer of a mixture of (1) an extract obtained in the solvent refining of a lubricating oil fraction and (2) oily material selected from the group consisting of polyisobutene, polypropene, and mixture thereof, said mixture having a viscosity less than 180 SUS at 210° F., a vulcanizing agent, a vulcanization accelerator, an accelerator activator, an antioxidant, and a bodying agent.

11. The method of preparing a rubber composition having good splicing and adhesion characteristics with respect to fabrics and good low temperature retraction characteristics, comprising permanently incorporating in fresh, unvulcanized rubbery butadiene-styrene polymer 25 to 100 parts per 100 parts of polymer of a mixture of (1) 80 to 20 parts by weight of mineral oil from the group consisting of mineral lubricating oil and aromatic solvent extract obtained from solvent refining of mineral lubricating oils and (2) 20 to 80 parts by weight of an oily material from the group consisting of polyisobutenes, polypropenes, and mixtures thereof, said mixture having a viscosity less than 180 SUS at 210° F.

12. Method in accordance with claim 11 in which the material from group (1) is aromatic solvent extract.

References Cited in the file of this patent
UNITED STATES PATENTS 2,324,980 Kilbourne _____ July 20, 1943

OTHER REFERENCES

Industrial and Engineering Chemistry, volume 23, issue #12 (pages 1357–1362), December 1931.